US007974170B2

(12) United States Patent
Milster et al.

(10) Patent No.: US 7,974,170 B2
(45) Date of Patent: Jul. 5, 2011

(54) APPLICATION OF WAVELET TRANSFORM FILTERING FOR PROCESSING DATA SIGNALS FROM OPTICAL DATA STORAGE DEVICES

(75) Inventors: Thomas Dean Milster, Tucson, AZ (US); Swetha Kannan, Tucson, AZ (US)

(73) Assignee: The Arizona Board of Regents on Behalf of The University of Arizona, Tucson, AZ (US)

( * ) Notice: Subject to any disclaimer, the term of this patent is extended or adjusted under 35 U.S.C. 154(b) by 407 days.

(21) Appl. No.: 12/007,635

(22) Filed: Jan. 14, 2008

(65) Prior Publication Data

US 2008/0285413 A1    Nov. 20, 2008

Related U.S. Application Data

(60) Provisional application No. 60/880,087, filed on Jan. 12, 2007.

(51) Int. Cl.
*G11B 7/0045* (2006.01)
*G11B 7/00* (2006.01)
(52) U.S. Cl. ............... 369/59.23; 369/53.15; 369/124.04
(58) Field of Classification Search ........................ None
See application file for complete search history.

(56) References Cited

U.S. PATENT DOCUMENTS

| 7,068,580 B2* | 6/2006 | Kobayashi et al. | 369/59.24 |
| 2004/0170102 A1* | 9/2004 | Ueno et al. | 369/53.22 |
| 2005/0078580 A1* | 4/2005 | Kochale et al. | 369/53.15 |
| 2007/0206456 A1* | 9/2007 | Sullivan et al. | 369/44.29 |

OTHER PUBLICATIONS

International Standard, "Information Technology—Data Interchange on Read-Only 120 mm Optical Data Disks (CD-ROM)", ISO/IEC 10149, Second edition Jul. 15, 1995, pp. 1-45.
Sashi K. Kasanavesi, et al., "Data Recovery From a Compact Disc Fragment", Optical Sciences Center/Optical Data Storage 2004, pp. 116-127.
Tom D. Milster, "Data Storage, Optical", in *The Optics Encyclopedia: Basic Foundations and Practical Applications* vol. 1 A-F, T.G. Brown, K. Creath, H. Kogelnik, M.A. Kriss, J. Schmit and M.J. Weber, eds., (Wiley-VCH Verlag GmbH &Co. KGaA, Weinheim, 2004), pp. 227-274.
Gilbert Strang, et al. "Wavelets and Filter Banks", Wellesley-Cambridge Press 1997, pp. 1-535.
Martin Vetterli, "Wavelets and Filter Banks: Theory and Design", IEEE Transactions on Signal Processing, vol. 40, No. 9, Sep. 1992, pp. 2207-2232.
Martin Vetterli, "Filter Banks Allowing Perfect Reconstruction", Signal Processing 10 (1986), pp. 219-244.
A. Farras Abdelnour, et al., "Design of 2-Band Orthogonal Near-Symmetric CQF", Proc. IEEE Int. Conf. Acoust., Speech, Signal Processing (CASSP), May 2001. F. Li, "Data Recovery From Various Damaged Optical Media", Master's thesis, University of Arizona, Department of Electrical and Computer Engineering, 2005, pp. 1-138.
A Papoulis, et al. Probability, Random Variables, and Stochastic Processes, 4th ed., New Delhi: Tata McGraw-Hill Publishing Company Limited, 2002, pp. 354-367.
D.L. Donoho, and I.M. Johnstone, "Adapting to Unknown Smootheness via Wavelet Shrinkage", J. Am. Stat. Assoc., 90, Dec. 1995, pp. 1999-1224.

* cited by examiner

*Primary Examiner* — William J Klimowicz
*Assistant Examiner* — Emily Frank
(74) *Attorney, Agent, or Firm* — Oblon, Spivak, McClelland, Maier & Neustadt, L.L.P.

(57) ABSTRACT

An optical data recovery system including an optical receiver configured to receive light reflected from an optical medium and produce modulated data, a processing unit configured to transform the modulated data into a series of transform coefficients respectively identifying frequencies of the modulated data at respective times, and the processing unit is configured to identify from the series of transform coefficients defect coefficients associated with positions in the modulated data where the modulated data is corrupted.

50 Claims, 13 Drawing Sheets
(8 of 13 Drawing Sheet(s) Filed in Color)

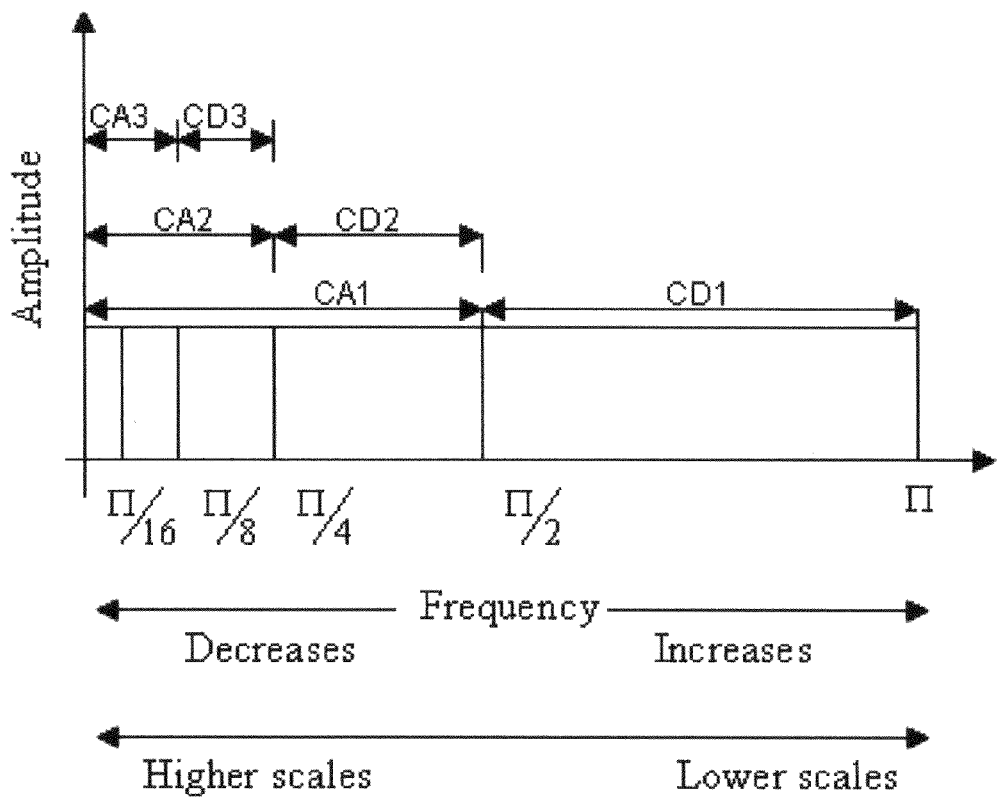

US 7,974,170 B2

APPLICATION OF WAVELET TRANSFORM FILTERING FOR PROCESSING DATA SIGNALS FROM OPTICAL DATA STORAGE DEVICES

CROSS REFERENCE TO RELATED APPLICATIONS

This invention is related to and claims priority to U.S. Ser. No. 60/880,087, entitled "Application of Wavelet Transform Filtering for Processing Data Signals from Optical Data Storage Devices," filed Jan. 12, 2007. The entire contents of U.S. Ser. No. 60/880,087 are incorporated herein by reference.

STATEMENT REGARDING FEDERALLY SPONSORED RESEARCH

This invention was made with government support under MDA904-02-C-1166 awarded by the Department of Defense. The government has certain rights in the invention.

BACKGROUND OF THE INVENTION

1. Field of the Invention

This invention is related to methods and systems for data recovery from damaged optical media, including enhancing signal recovery from optical media subjected to handling and non-archival environments.

2. Description of the Related Art

Optical data storage systems use light to write and read information. A schematic of typical read/write system is shown in FIG. 1A. The system includes laser source 2, storage medium 4, beam splitter 6, illumination optics 8, servo/data optics 10, detectors 12, and amplifier/decoder 14. In a reading process, a low-power laser beam from laser source 2 scans a data pattern on spinning storage medium 4, which may be a compact disk (CD). A reflected signal is directed with a beam splitter 6 to detectors 12. Detectors 12 produce a current signal, which is then decoded into user data. In a writing process, a higher power laser beam from source 2 writes a data pattern on spinning disk 4.

In the writing process, an input stream of digital information is converted with an encoder and a modulator (not shown) into an analog current drive signal for the laser. The '1's in the drive signal switch the laser diode on and off alternatively. The intense light beam from the laser, when focused on the rotating scanning disc surface through the illumination optics, heats up the disc surface at the focused spot. The reflective property of the data layer at these regions is changed once the temperature goes beyond a threshold level. In this way, data are written on a spiral track around the center of the optical disc with alternating data marks and lands.

In the readout process, the laser is typically operated at a low, constant output power level that does not heat the medium, so that reflection is not affected by the laser beam. As the disc rotates, the reflected light is modulated upon reflection from the recorded data marks. The reflected light is then directed to detectors through servo/data optics and converted into an electrical detector current.

This detector current is a representation of the data pattern on the disc and is decoded into a digital signal. The detector current is a sinusoidal narrow-band radio frequency (RF) signal whose frequency for standard low speed (1×) CD readout varies from 196 kHz to 720 kHz. The detector current includes distinct frequencies corresponding to the nine possible lengths of data marks. This non-stationary signal exhibits a frequency content that varies randomly, depending on the occurrence of different runlengths. Further, the occurrence of defects on the surface of the disc cause sudden changes in the frequency content of the signal.

Data on a CD are written on a spiral track of alternating "data marks" and "lands." The data marks and lands constitute an RLL data stream as shown in FIG. 1B with following constraints:

Minimum run-length constraint, d=2 (3T),
Maximum run-length constraint, k=10 (11T).

Thus, in this convention, there are nine run lengths for the data marks or lands (i.e., 3T, 4T, . . . 11T). Examples of basic units for the run lengths are shown in FIG. 1C.

Conventionally, a three-step modular approach in recovering data from damaged CD using microscope images has been used. In this approach, a readout signal is derived from the images. Then, data bytes are recovered from the signal. Finally, these bytes are arranged in a user-defined sequence. The conventional approach allows recovery from microscopic images and takes approximately 500 hours to recover data from a CD size area.

The following references whose contents in entirety are incorporated herein by reference represent background techniques and procedures used conventionally for data reading/writing/recovery:

*Information technology—Data interchange on read-only 120 mm optical data discs (CD-ROM)*, ISO/EEC International Standard 10149, 2nd Ed.-1995.

S. Kasanavesi, T. D. Milster, D. Felix, T. Choi, "Data Recovery from a Compact Disc Fragment," *Proc. SPIE,* 5777(1): pp. 116-127, September 2004.

T. D. Milster, "Optical Data Storage," in *The Optics Encyclopedia: Basic Foundations and Practical Applications,* T. G. Brown, K. Creath, H. Kogelnik, M. A. Kriss, J. Shcmit, M. J. Weber, (eds.), Berlin:Wiley-VCH, 2004.

G. Strang, and T. Nguyen, *Wavelets and Filter Banks,* Wellesley-Cambridge Press, 1997

M. Vetterli, "Wavelets and Filter Banks: Theory and Design", IEEE transactions on signal processing, Vol. 40, No. 9, September 1992.

M. Vetterli, "Filter Banks allowing Perfect Reconstruction", Signal Processing 10 (1986), pp. 219-244.

A. F. Abdelnour, and I. W. Selesnick, "Nearly Symmetric Orthogonal Wavelet Bases", Proc. IEEE Int. Conf. Acoust., Speech, Signal Processing (ICASSP), May 2001.

F. Li, "Data recovery from various damaged optical media", Master's thesis, University of Arizona, Department of Electrical and Computer Engineering, 2005

A. Papoulis, and S. U. Pillai, *Probability, random variables, and stochastic processes,* 4th ed., New Delhi: Tata McGraw-Hill Publishing Company Limited, 2002, pp. 354-367.

D. L. Donoho, and I. M. Johnstone, "Adapting to Unknown Smoothness via Wavelet Shrinkage", J. Am. Stat. Assoc., 90, 1200 (1995).

SUMMARY OF INVENTION

In one embodiment of the invention, there is provided an optical data recovery system including an optical receiver configured to receive light reflected from an optical medium and produce modulated data. A processing unit is provided and is configured to transform the modulated data into a series of transform coefficients respectively identifying frequencies of the modulated data at respective times. The processing unit is configured to identify from the series of transform coefficients defect coefficients associated with positions in the modulated data where the modulated data is corrupted.

In one embodiment of the invention, the optical data recovery system also includes a drive mechanism configured to translate the optical medium, a beam source configured to irradiate the optical medium, a servo controller configured to change a relative distance between the optical receiver and the optical medium. The servo controller includes a defect identification circuit which identifies whether the light is reflected from a defect, and the servo controller is configured to control the relative distance between the optical receiver and the optical medium, until the light reflected from the optical medium returns to a normal level.

In one embodiment of the invention, there is provided a method for data recovery from corrupted optical medium which performs a transformation on modulated data obtained from the corrupted optical medium to identify frequencies of the modulated data at respective times, identifies defect coefficients associated with positions in a data stream of the modulated data where the modulated data is corrupted, replaces the defect coefficients, and performs an inverse transformation to produce a decoded signal for the corrupted optical medium.

In one embodiment of the invention, there is provided a computer program product stored on a computer readable medium which, when read by a processor, executes program executable functions. The functions include performing a transformation on modulated data obtained from the corrupted optical medium to identify frequencies of the modulated data at respective times, identifying defect coefficients associated with positions in a data stream of the modulated data where the modulated data is corrupted, replacing the defect coefficients, and performing an inverse transformation to produce a decoded signal for the corrupted optical medium.

It is to be understood that both the foregoing general description of the invention and the following detailed description are exemplary, but are not restrictive of the invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee. A more complete appreciation of the invention and many of the attendant advantages thereof will be readily obtained as the same becomes better understood by reference to the following detailed description when considered in connection with the accompanying drawings, wherein:

FIG. 7B is a schematic depicting the spectral resolution of the coefficients decomposed FIG. 7A;

DETAILED DESCRIPTION OF THE EMBODIMENTS

Optical storage devices, like CD systems, are manufactured to be insensitive to minor scratches and other damages occurring on the surface of the disc due to everyday usage. However, it is common in operation to partially destroy a CD by accidentally causing deep scratches or breaking the CD into pieces. Regular CDs have a flat and smooth transparent substrate with a thickness of 1.2 mm+/−100 µm. The invention relates to methods to recover data from discs with sudden depth changes that go beyond 100 µm, like that encountered with a deep scratch. The invention techniques can be applied to less severe surface alterations in order to improve readout in commercial drives.

Optical Spin Stand

Figure 2:
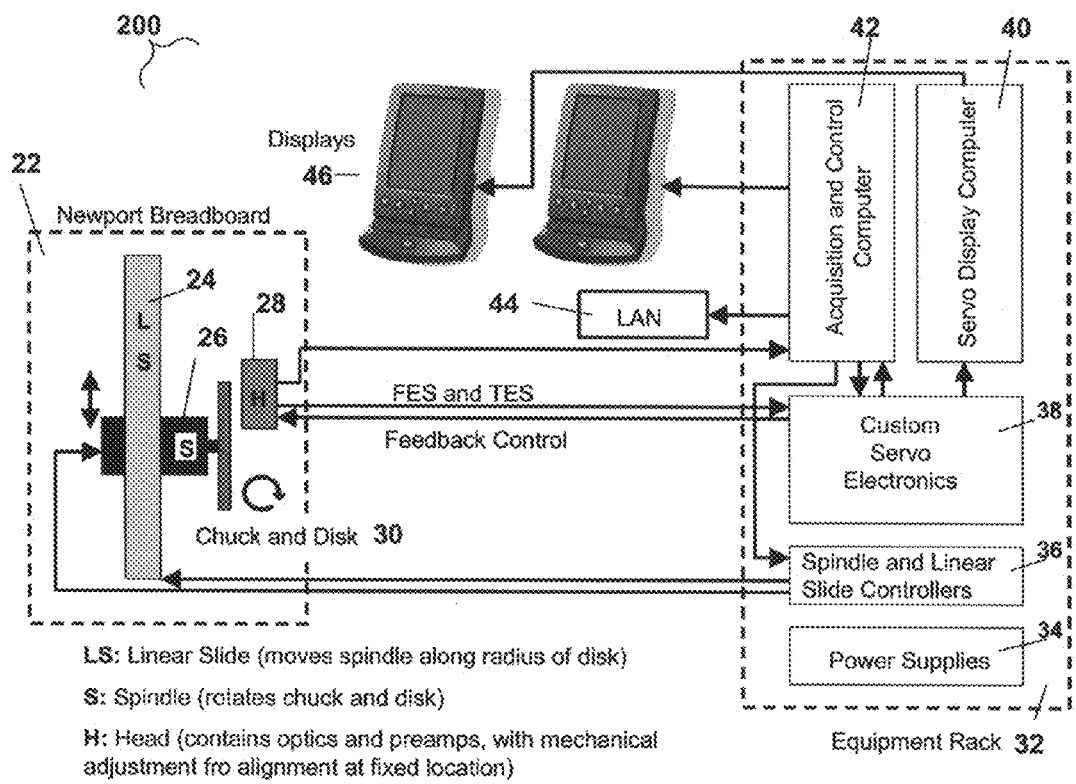
FIG. 2 is a schematic layout of an optical spin stand system according to an embodiment of the invention.

Referring now to the drawings, wherein like reference numerals designate identical or corresponding parts throughout the several views, FIG. 2 is a schematic layout of an optical spin stand system 200 utilized in one embodiment of the invention. The optical spin stand system includes a breadboard 22 that further includes linear air slide 24, spindle 26, optical head assembly 28, and chuck and disk 30. Optical spin stand system 200 also has an equipment rack 32 which includes power supplies 32, spindle and linear slide controllers 34, custom servo electronics 38, servo display computer 40, and acquisition and control computer 42. Further included in the system are local area network (LAN) 44 and display units 46. The optical spin stand system is similar in operating mechanics to the optoelectronics of a commercial CD player. Spindle (S) 26 rotates chuck and disk 30. Linear air slide (LS) 24 translates the optical disk on a slide carriage. The carriage is moved for example with a lead screw rotated in this embodiment with a computer controlled stepper motor. In this embodiment, fixed optical head assembly (H) 28 is mounted at specified distance away from the disk by adjustment of the slide carriage. An optical beam from the optical head assembly reads information from the disk. The optical head assembly in one embodiment includes detectors that generate servo and RF signal currents from the reflected light beam. At a fixed position of the linear air slide, the optical head reads within ±4 tracks of an average radius.

Reflected light from a data mark has a lower amplitude than the surrounding land regions. Detectors used in this system in one embodiment use negative logic, where a higher voltage corresponds to a lower intensity in the retrieved signal and vice versa. This relationship manifests itself in the digitized signal where the upper signal level corresponds to the data marks and the lower signal level corresponds to the lands.

The included electronic circuitry in the optical spin stand system provides analog closed loops for the focus and tracking actuators of the optical head assembly. The inputs for the control loop come from the focus error signal (FES) unit and tracking error signal (TES) unit that are generated in the optical head assembly. The RF data signal from the optical head assembly is converted directly for example with an 8-bit high speed 100 Mbps digitizer that is mounted on the acquisition and control computer (ACC) 42. The ACC also controls the position of the linear slide and the rotation of the spindle.

After the start of acquisition, in one embodiment, the electronic circuitry waits until the detector sum achieves a level indicating that the laser beam is near focus. The control loop is then activated, focus is acquired, and tracking is locked. A signal is then transmitted to the ACC that triggers data acquisition for a preset time, where the collection time is determined based on the length of the segment. When the acquisition is complete, the circuitry sets the optical head assembly's actuator in a rest position that is optimized to lock on the next revolution of the fragment. The rest position is determined in one embodiment of the invention as the average position during the last data acquisition.

The optical spin stand system is configured to compensate for sudden depth changes of more than 100 μm that occur in the case of severe damage. This capability is given by the inclusion of defect detecting circuitry, which is described later. At the location of the defects, the feedback control loop sends error signals to drive the actuator out of its mechanical range. With commercial systems, focusing and tracking loops unlock, and the actuator returns to a neutral position. A search routine then moves the laser head in and out axially to find the disc surface. Thus, in commercial systems, it takes some time to re-acquire servo lock, and the laser spot travels a significant distance along the track. If another defect occurs before the system can lock, no information can be recovered.

Figure 3:
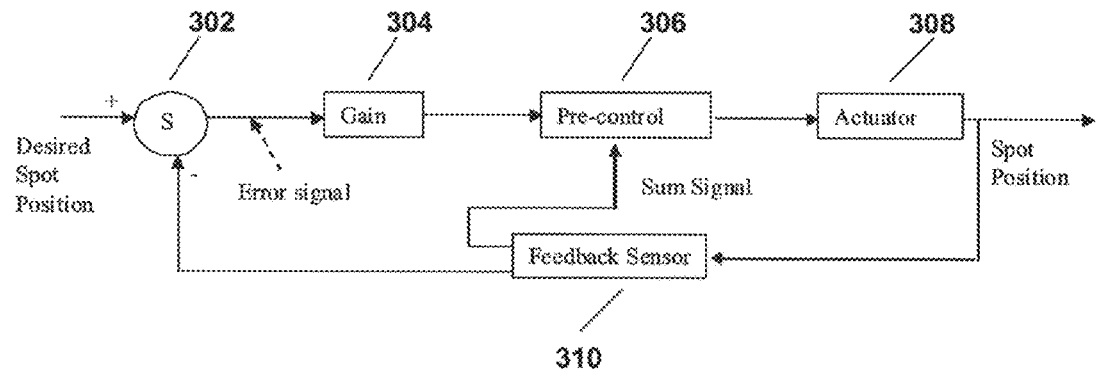
FIG. 3 is a schematic of a defect detecting circuit according to an embodiment of the invention.

To prevent this situation, in one embodiment of the invention, a pre-control unit 306 has been included, as shown in FIG. 3. More generally, FIG. 3 is a schematic of a defect detecting circuit according to one embodiment of the invention. The defect detecting circuit includes sum circuit 302, gain unit 304, pre-control unit 306, actuator 308, and feedback sensor 310. The optical spin stand system detects defect spots depending on the laser-head position feedback signal and breaks the feedback at the defects.

A sum signal is proportional to the light reaching the finite-sized servo detectors. As the readout beam passes through a defect, there is sudden change in the sum signal when there is a sudden decrease in the intensity of light received. The pre-control unit compares the sum value with a pre-set reference voltage to decide if the error signal is due to a defect. If the sum value exceeds the pre-set reference voltage, a defect is identified. If so, the pre-control unit discards the error signal and holds the actuator at the same position for a particular period of delay time $T_d$. The delay time is the time necessary for the light intensity to return to a normal range of reflectance. Upon passage of the delay time, the control loop is reactivated, and the ACC is able to relock onto the data marks immediately.

In another embodiment of the invention, modulated data obtained from a corrupted optical media are subjected to a wavelet transformation to be discussed in more detail later. Transform coefficients associated with data from defect sites are identified (for example by their low frequency characteristics since the defects typically have a large spacing than uncorrupted data on the optical media), the identified transform coefficients are modified for example by replacing these coefficients with median coefficient values, and afterwards, an inverse wavelet transformation is used to produce a decodable signal. A wavelet transformation (and its inverse) is described herein as one example of a transform which transforms the modulated data into a series of transform coefficients respectively identifying frequencies of the modulated data at respective times. From the series of transform coefficients, defect coefficients associated with positions in the modulated data where the modulated data are corrupted are identified.

Figure 4:
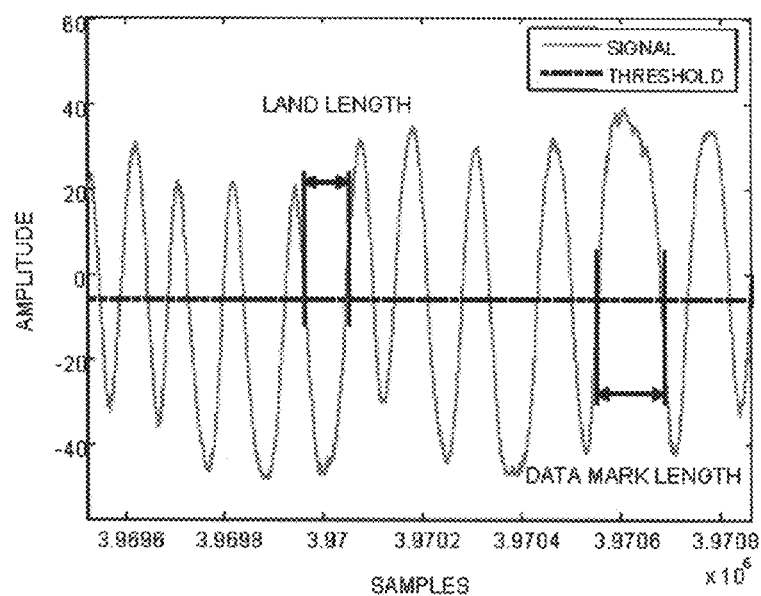
FIG. 4 is a schematic of a determination of data mark and land lengths from the sinusoidal signal according to an embodiment of the invention.

FIG. 4 is a schematic of a determination of data mark and land lengths from a sinusoidal data signal according to one embodiment of the invention. A portion of the digitized RF signal obtained from the optical spin stand system is shown in FIG. 4. An arithmetic mean of the digitized RF signal is calculated and used as a threshold. Adjacent crossings of the RF signal with this simple threshold delineate the boundaries of data marks and lands. FIG. 4 shows on the drawing a threshold line, a land length, and a data mark length. By arbitrarily shifting the threshold line up for example, the land length increases and the data mark length decreases. Since, there are nine run lengths for the data marks or lands, an analysis of the derived distribution of run lengths provides one metric for evaluating the quality of the read data.

Figure 1A:
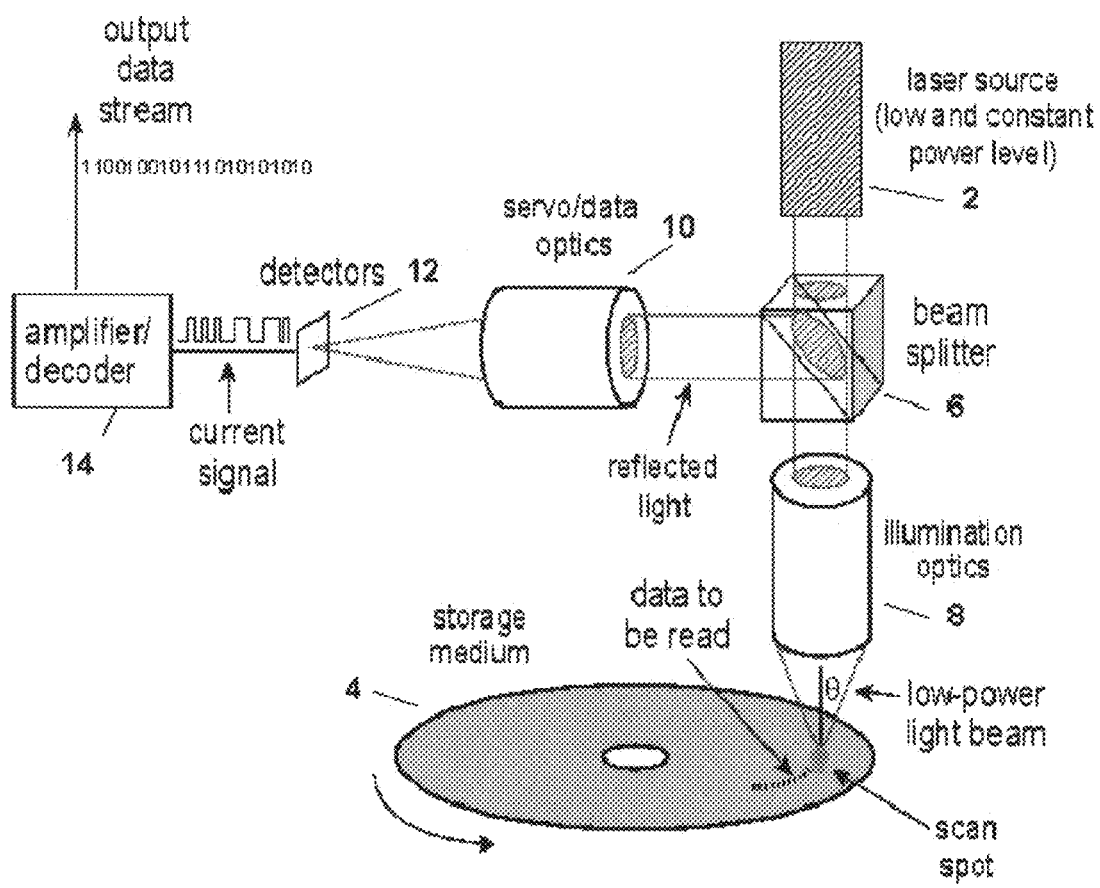
FIG. 1A is a schematic diagram of an optical read/write system.
Figure 1B:
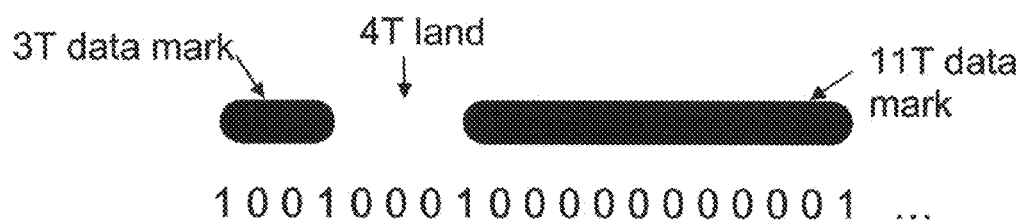
FIG. 1B is a schematic diagram of a basic data/land/data layout on an optical disk.
Figure 1C:
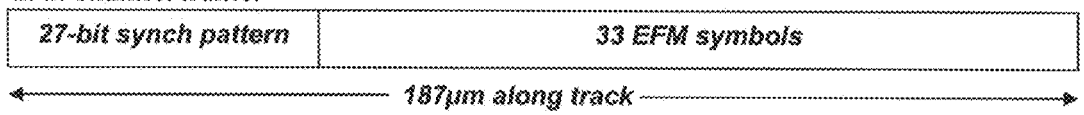
FIG. 1C is a schematic diagram of basic units of information stored on a CD.

For example, a statistical analysis of the quality of the signal can be checked by plotting a histogram of data mark and land lengths into nine groups corresponding to the run lengths from 3T-11T, examples of which are shown in FIG. 1B. The grouping can be accomplished by automatic bin segmentation on the data marks and the lands. The procedure can then extract the real, uncorrupted data bytes on the CD, where the discrete run lengths are assigned to the temporal data stream, decoded with a look-up table to eight-bit values, then descrambled and de-interleaved. Error correction can also be applied in the recovery process through use of the ECC code words imbedded in the data stream.

In one embodiment of the invention, a wavelet transform (WT) analyzes read data signals in a scale-time domain. The term scale in this art is similar to term scale on maps. Higher scales correspond to a non-detailed global view (of the signal), and lower scales correspond to a detailed view (of the signal). In other words, the higher frequencies are present in lower scales and vice versa. Wavelet transforms provide poor frequency resolution at lower scales (higher frequencies), but provide a detailed view of the signal in the time domain (good time resolution), and good frequency resolution at higher scales (lower frequencies) with a non-detailed global view of the signal in the time domain (poor time resolution).

Figure 5A:
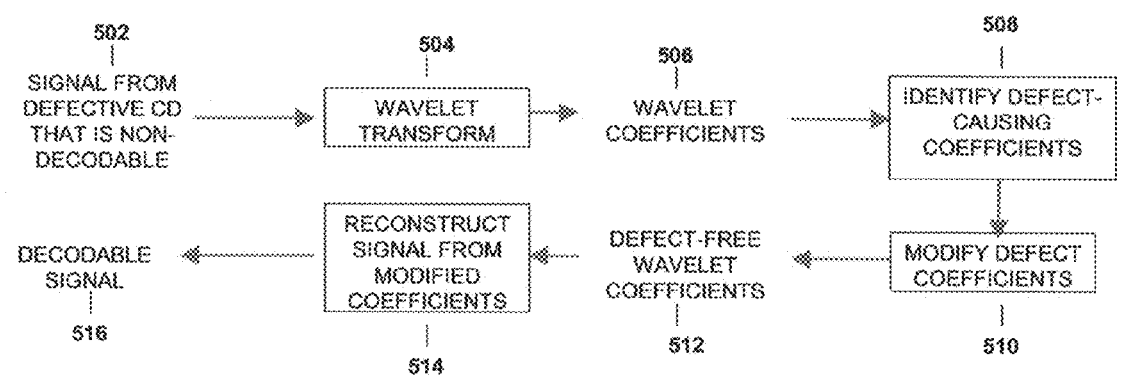
FIG. 5A is a schematic depicting an application of wavelet transforms in data recovery.

FIG. 5A is a schematic depicting an application of wavelet transforms in data recovery. In FIG. 5A, a signal from a defective CD that is non-decodable (502) is input into a WT (504). Wavelet coefficients (506) are output from the WT and then defect-causing coefficients are identified (508). The defect-causing coefficients are then modified (510) to form defect-free wavelet coefficients (512). The modified coefficients can then be used to reconstruct the signal (514) to produce a decodable signal (516).

A discrete two-channel WT can be implemented by passing the read data signal through a bank of half band filters. By using a WT, approximation coefficients $C_A$ causing defects are identified. These coefficients are altered, and the signal is reconstructed back from these altered approximation coefficients. For example, since a WT analyses the signal in a time-frequency domain, information about defect is concentrated in the lowest band of frequencies. This frequency band can be singled out with good frequency resolution. The coefficients associated with this frequency band are altered (as described below), and the signal is reconstructed back from the initially derived coefficients and the altered coefficients.

Figure 5B:
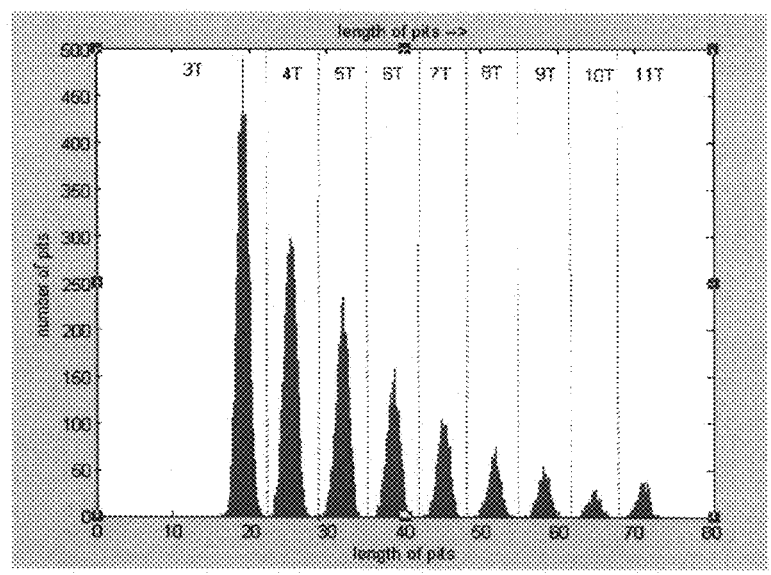
FIG. 5B is a schematic illustrating a histogram analysis of data run lengths.

Use of this method in FIG. 5A improves the performance of the data recovery process as compared to conventional data recovery. By excluding coefficients associated with defect frequencies, the probability of error ($P_E$) in recovering data is decreased, as elaborated below. The reliability of the decoding procedure can be determined pictorially by the histogram plot and statistically from the probability of error from a Gaussian approximation model. FIG. 5B is a schematic illustrating a typical histogram. After signal processing is performed on the signal to convert the signals into run lengths, bin segmentation is done and a histogram plot of the bins is made. From the histogram plots of data from unaffected discs, nine distinct groups of bins appear corresponding to run lengths 3T to 11T. The histograms within each group follow a Gaussian distribution. The Gaussians are centered around the mean of each group and added together to form a Gaussian fit for the entire data sequence. The decision points between run lengths are obtained as the valley points between the peaks. Based on these decision points, the sample run lengths are converted into clock-time run lengths from 3T to 11T. In the case of damaged CDs, there are no clear separations of the groups. The Gaussian fits of adjacent groups intersect, and the minimum points between groups are taken as decision points.

More specifically, the probability of error $(P_E)_i$, $i \in \{3-11\}$ is calculated by dividing the area under the Gaussian of a particular group i outside its decision points by the total area of the Gaussian. The total $P_E$ is the sum of the $(P_E)_i$'s weighted by the probability of occurrence $(P_C)_i$ of each run length. $(P_C)_i$ is determined by dividing the area under its Gaussian fit by the area under the sum of all Gaussians. Total probability of error $P_E$ defines an approximate statistical measure for a performance comparison of the signal processing algorithms.

In the case of damaged CD regions, the inventors have found that there are no clear separations of the groups. The Gaussian fits of adjacent groups intersect, and the minimum points are taken as decision points. The probability of error $(P_E)_i$, where $i \in \{3-11\}$ is calculated by performing hypothesis testing at each point of minima. The total $P_E$ is the sum of the $(P_E)_i$'s weighted by the probability of occurrence $(P_C)_i$ of each run length. $(P_C)_i$ is determined by dividing the area under its Gaussian by the area under the sum of all Gaussians.

In one embodiment, wavelet transformation especially suited for the invention is a filter bank of nearly symmetric orthogonal filters with K=2 and L=6, as described by Abdelnour, referenced above: A. F. Abdelnour, and I. W. Selesnick, "Nearly Symmetric Orthogonal Wavelet Bases", Proc. IEEE Int. Conf. Acoust., Speech, Signal Processing (ICASSP), May 2001. As noted above, this reference is incorporated herein in its entirety by reference. In particular, this disclosure incorporates by reference those parts of Abdelnour in Section 3 describing nearly symmetric impulse filters. Particular filter coefficients suitable for the invention are provided below.

The inventors have discovered that these filters are particularly useful in data recovery because these satisfy two conflicting characteristics of filters: one of orthogonality and one of symmetry. Orthogonal filters have the property of producing coefficients which have independency over each other such that coefficients associated with defects (i.e., defect-coefficients) can be found, and altered while still maintaining other properties of the signal. Thereby removal of effects from damage is done without loss of information from the undamaged regions. Orthogonal filters are more useful for analysis of signal properties rather than for processing of data signals. For example, wavelet transform with Daubechies filters have been found not work well for data recovery.

Symmetric filters are desired because theoretically perfect reconstruction of original signals from transformed signals is possible if the transformation and inverse are performed with filters having symmetric coefficients. But if filters are perfectly symmetric, the filters are not orthogonal. The result is that the transformed coefficients overlap and the defect coefficients cannot be found even in the transformed signals.

Thus, in one embodiment of the invention, substantially symmetric, orthogonal filters are used which have a subset of symmetric coefficients which makes close to perfect reconstruction possible. In data recovery, the inventors have discovered that, when these substantially symmetric filters were used to perform wavelet transform and inverse wavelet transform on the data signals, insignificant change in the signal properties or the information content was observed.

Figure 6:
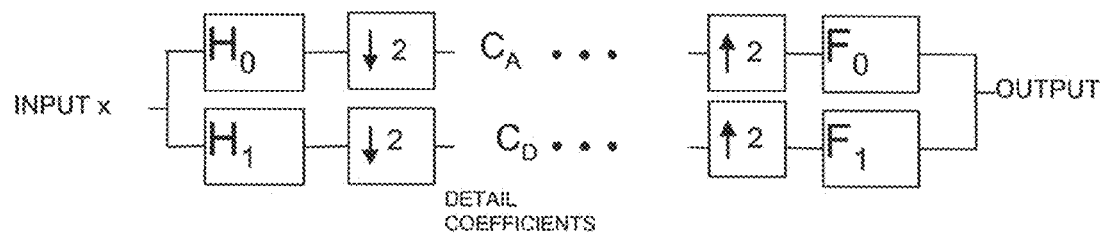
FIG. 6 is a schematic depicting a procedure for a single step 2-channel wavelet decomposition and reconstruction.

In the embodiment of FIG. 6, a data signal is passed through a set of low pass ($H_0$) high pass ($H_1$) filters, simultaneously. These are half-band filters, so the resulting signals are halved in bandwidth, but are individually equal to the input signal length. Since these signals would require more memory than the original signal, these signals are down sampled by a factor of 2 by omitting every other sample. The resulting lower frequency coefficients are herein referred to as approximation coefficients ($C_A$) and the higher frequency coefficients are herein referred to as detail coefficients ($C_D$).

The signal is reconstructed from these coefficients by performing a reverse process, where the coefficients are interpolated with zeros to upsample by a factor of 2. The upsampled signals are passed though inverse filters $F_0$ and $F_1$, and the signal is reconstructed by adding the two outputs.

Wavelet analysis of the signal is done by successively decomposing the signal. The wavelet decomposition in one embodiment is a single-sided tree decomposition, i.e., only the previous approximation coefficients are repeatedly split into approximation and detail coefficients at each level, while the detail coefficients are kept as is.

Figure 7A:
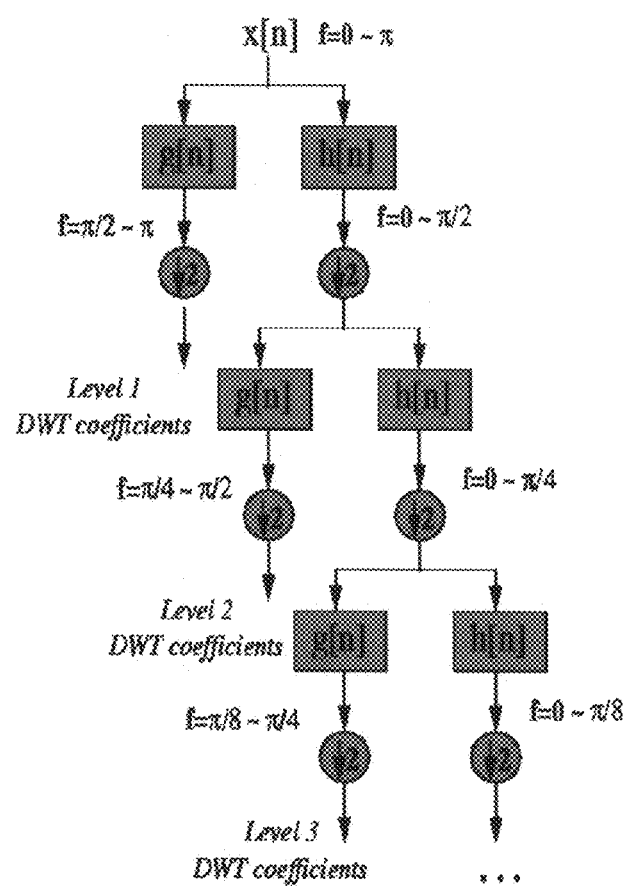
FIG. 7A is a schematic depicting a simple tree decomposition of a signal x.

FIG. 7A is a schematic depicting one embodiment of the invention utilizing a simple tree decomposition of a signal x[n]. In this process, a discrete time two-channel WT is used. Decomposition occurs by way of a single-sided tree structure. Approximation coefficients (lower half-band, $C_{Aj}$) and detail coefficients (higher half-band, $C_{Dj}$) are derived by way of the 12-level decomposition shown in FIG. 7A. At each stage of the structure, the frequency band reduces by 2. According to the Nyquist rule every other sample is redundant and hence the signal is sub-sampled by 2 after each filtering stage. The low pass and high pass filters are quadrature mirror filters—ensuring reconstruction since half band filters form orthonormal bases. The quadrature mirror filter relation is as follows:

$$g[L-1-n] = (-1)^n * h[n]$$

In the above relation, g[n] is the impulse response of a high pass filter, and h[n] is the impulse response of a low pass filter.

The simple tree decomposition utilizing the 12-level decomposition provides good frequency resolution of the defect-causing coefficients. The number of samples analyzed is varied to be a multiple of $2^{12}$. A tree decomposition is shown in FIG. 7A, and the spectral content of the coefficients is shown in FIG. 7B for a signal x, which has a frequency band ranging from $0-\pi$.

The term scale and level as used herein have a direct relation. This decomposition is a two-channel WT, the scale is $2^j$, where j stands for the level of decomposition. Thus, by traversing through the tree, the number of samples contained at each scale/level decreases progressively from half the number of signal samples at the first level from to $\frac{1}{2^j}$ times the original number of samples at the $j^{th}$ level. Coefficients at higher scales (lower frequency) have a poor time resolution as compared to the ones at lower scales. The spectrum diagram in FIG. 7B shows that the frequency resolution is better at lower frequencies (higher scales) than at higher frequencies.

Accordingly, the invention uses wavelet transforms (WT) which incorporate functionally programmed filters such as for example finite impulse response (FIR), causal, orthogonal, nearly symmetric filters (such as the Abdelnour functions described above) with K=2 and L=6, where K stands for the number of non-symmetric coefficients and L stands for the number of symmetric coefficients. Such filters allow complete reconstruction of the signal while still using orthogonal filter bases. The filter coefficients of the four filters in FIG. 6 are listed in Table I below.

TABLE I

| n | $H_0$ | $H_1$ | $F_0$ | $F_1$ |
|---|---|---|---|---|
| 0 | 0 | −0.0112 | 0.0112 | 0 |
| 1 | 0 | 0.0112 | 0.0112 | 0 |
| 2 | −0.0884 | 0.0884 | −0.0884 | −0.0884 |
| 3 | 0.0884 | 0.0884 | 0.0884 | −0.0884 |
| 4 | 0.6959 | −0.6959 | 0.6959 | 0.6959 |
| 5 | 0.6959 | 0.6959 | 0.6959 | −0.6959 |
| 6 | 0.0884 | −0.0884 | 0.0884 | 0.0884 |
| 7 | −0.0884 | −0.0884 | −0.0884 | 0.0884 |
| 8 | 0.0112 | 0 | 0 | 0.0112 |
| 9 | 0.0112 | 0 | 0 | −0.0112 | where the coefficients of the analysis bank, $H_0$ (low pass) and $H_1$ (high pass) and those of the synthesis bank, $F_0$ (low pass) and $F_1$ (high pass).

Damage Type Response Examples

The performance of the spin stand and the signal processing algorithms used in the recovery of the data mark and land lengths were confirmed by recovering data from CDs that underwent severe damage.

As an attempt to induce severe damage on the disc, a knurling machine was used to create a matrix of depressions in a polycarbonate substrate on the surface of a disc when it is forced through two spiked rollers. The disc remains in one piece and maintains its transparent substrate. Data marks are viewable in most areas of the disc, but cannot be retrieved using a commercial player. Knurled discs exhibit regular-spaced depressions due to the knurling pins pressed into the disc. These depressions are approximately 250 µm long, 420 µm wide, and 1 µm deep. The distance between adjacent depressions is about 1 mm. Discs were knurled manually by forcing the spiked cylinder from a disassembled knurled over the disc surface under certain pressure. Sample 1 is knurled on the data layer (dye) side, and Sample 2 is knurled on the substrate side.

Dye-Side Knurling (Sample 1)

Figure 8A:
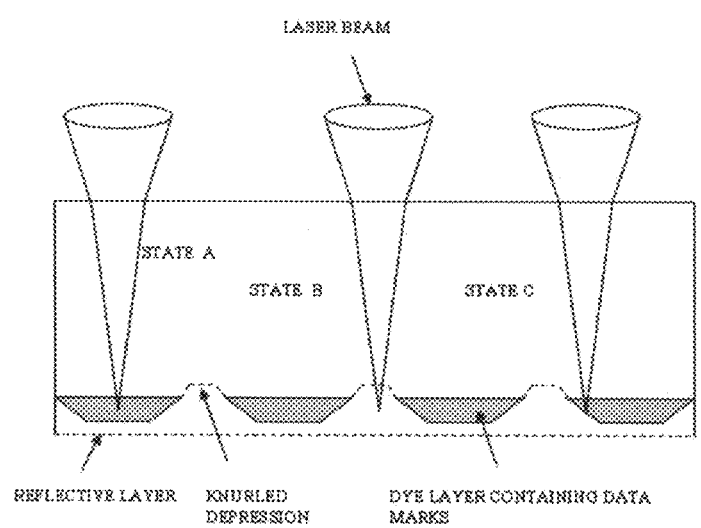
FIG. 8A is a schematic of a sample (Sample 1) showing three positions of laser light on a dye-side knurled disc.

In dye-side knurling, the substrate-side remains in good condition. Hence, the readout system laser beam locates the substrate and focuses onto the dye, where data are stored. FIG. 8A shows three different positions of the laser beam and Sample 1. State A is similar to when a laser head reads an undamaged disc. State B occurs when knurling depressions are deep enough to penetrate the dye layer. The knurling operation destroys the reflective layer of State B, producing almost no reflected light.

State C occurs often in a dye-side knurled disc. It is the transition between states A and B. The reflectivity declines in the order of states A, C, and B. The laser head receives almost no feedback in State B, and would enter search mode (unlock state) to find the disc surface without the defect detecting circuitry. Conventionally, an actuator tries to swing, following the swing in the FES, to acquire focus lock. At state B, the swing in FES drives the actuator out of the mechanical swing range, but the defect detecting circuit of the invention detects the defect, and the servo controller of the invention prevents the actuator from swinging along with the output from the FES unit. In one embodiment, the actuator is held at the best preceding non-focus error position for the time $T_d$ to enable the system to lock focus immediately after the defect. In other embodiments, the actuator is held at a predetermined position close to the expected focus length. In other embodiments, the time the actuator is held is not restricted to times $T_d$.

Figure 9A:
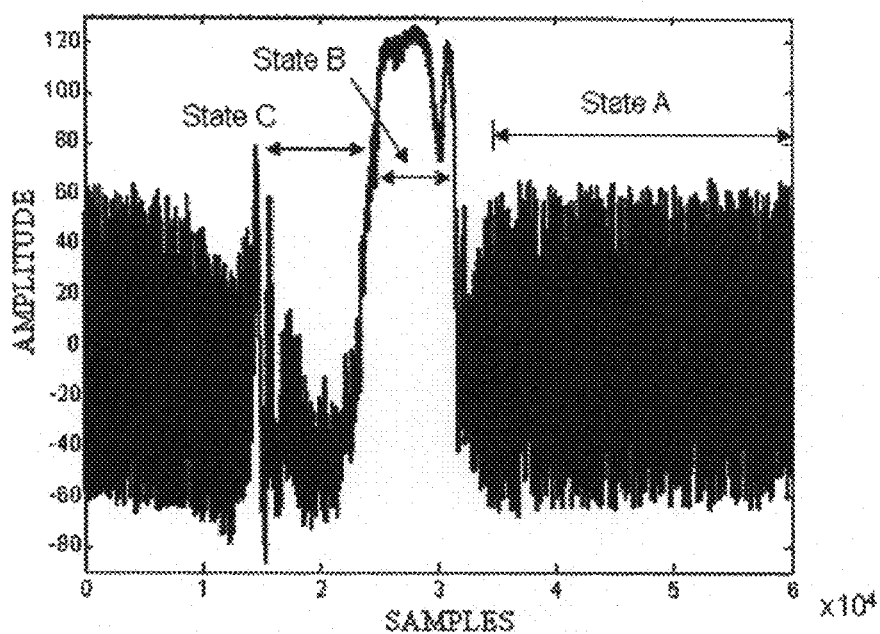
FIG. 9A is a schematic of an RF data signal (solid line) from Sample 1 of FIG. 8A depicting a threshold from the exclusion technique which differs from a simple threshold.

Data received from Sample 1 are as shown in FIG. 9A. The three cases A, B and C are as marked in the figure. At state A, the retrieved signal is in accordance to CD specifications. The signal is not retrievable in the State B regions of corruption. This condition is characterized in the signal as a high peak that corresponds to very low intensity of reflected light from these regions. The peak-to-peak amplitude at these portions reduces to as low as 3.6% of the normal peak-to-peak amplitude. In state C, the system manages to come back into focus and comes back to the same track, but the dynamic swing (or the envelope) of the signal decreases.

Substrate-Side Knurling (Sample 2)

Figure 8B:
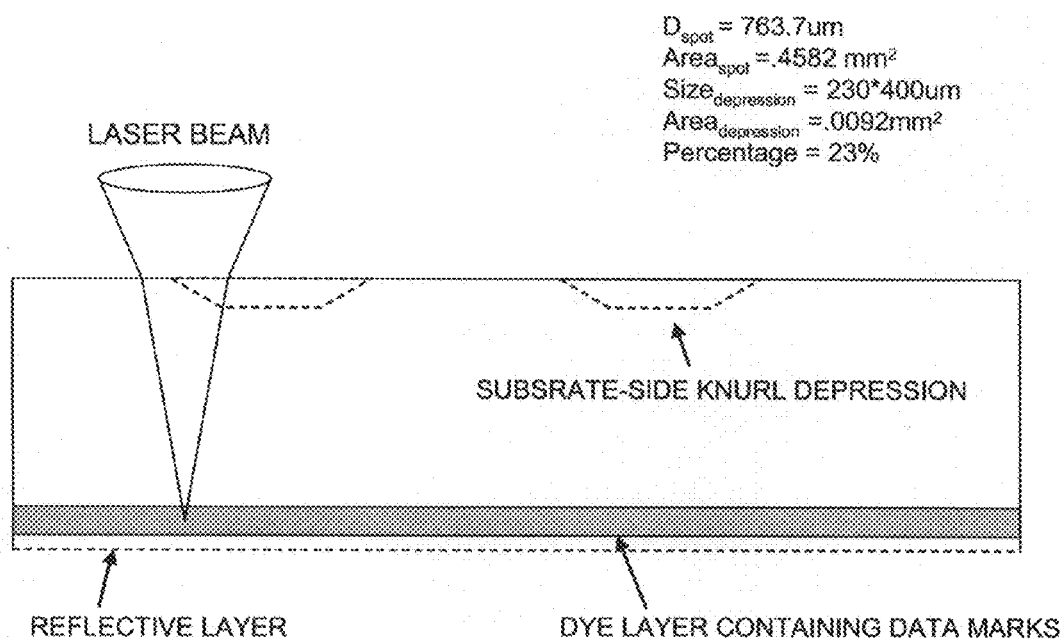
FIG. 8B is a schematic of a sample (Sample 2) showing a substrate-side knurled depression.
Figure 9B:
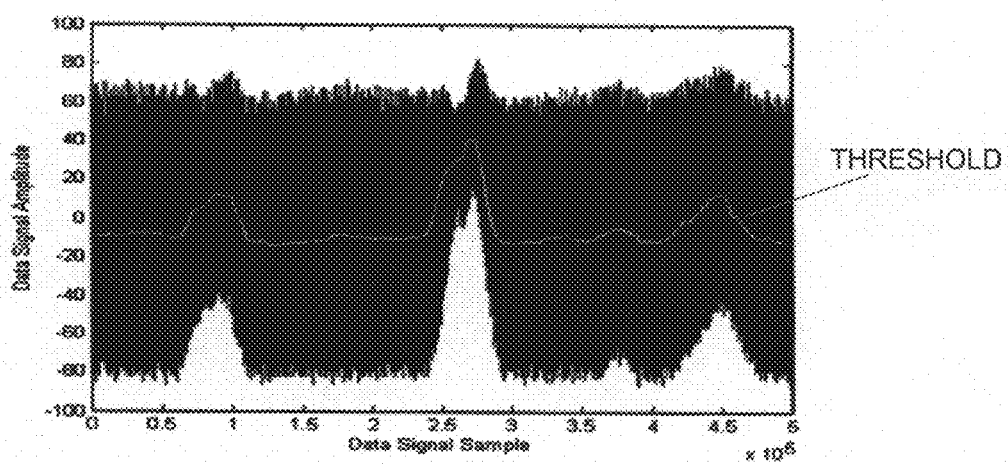
FIG. 9B is a schematic of an RF data signal (solid line) from Sample 2 of FIG. 8B depicting a threshold from the exclusion technique which differs from a simple threshold.

Substrate-side knurling as shown in FIG. 8B, has more impact than dye-side hurling, due to the depressions in the substrate severely distracting the focus servo. The laser spot area on the substrate surface is around 0.45 mm². The rectangular depression has a surface area of 0.09 mm², which occupies 20% of the spot area. The depression scatters a portion of the light from the laser beam, and the remaining light reflects from the substrate in the usual manner. The control signals are solely based on the light that reaches the detector. As shown in FIG. 8B, the depressions partially block the light, which causes an uneven distribution of light at the detectors. If the hole obstructs the laser beam, the control signal from the detectors indicates an incorrect position to the servo loop. However, sufficient reflected light intensity is collected, so a reduced modulation in the RF signal is observed. The digitized RF signal retrieved from a substrate-side knurled disc has closely spaced bumps in the knurled portion in the data, as shown in FIG. 9B from Sample 2. At the bumps, signal amplitude reduces to as low as 30% of the peak-peak amplitude of the undisturbed signal.

Scratched Substrate (Sample 3)

Knurling is an extreme case of damaging a disc. The algorithms and circuits developed to adapt to these extreme defects are extended to data recovery for other types of damage, like scratches on the disc surface. For performance of the algorithms of the invention on a scratched disc, scratches were made on the disc substrate by using ordinary sandpaper and applying different pressures. There is no uniformity in the distance between the scratches and the width of the scratches, which is understandable considering the fact that the grains on the surface of the sand paper are not uniformly distributed, as in the case of a knurling roller. The physical manifestation of these defects is defined by surface quality specifications of a polished glass surface with a scratch and dig number. Scratch and dig are specified as per MIL-O-13830A.

This quantification is important, because surface microroughness is the major cause of surface scattering in the visible and ultraviolet regions of the spectrum. Depending on the severity of defects, the scattering has dynamic effects on the focus servo. In addition, the surface is also quantified by the rms value, the peak-valley value, and the minimum separation between the scratches determined using an optical profiler. The surface quality of a Sample 3 disc is as listed in Table II.

The signal recovered from Sample 3 has a similar appearance to that from the substrate-knurled disc shown in FIG. 9B. The signal amplitude reduces to as low 50% of the peak-peak of the undisturbed signal. Hence, the algorithms developed for substrate-side knurled disc are expected to improve recovery statistics.

TABLE II

SURFACE ROUGHNESS PARAMETRIC VALUES OF A SCRATCHED DISC (Sample 3)

| Parameter | Value |
| --- | --- |
| surface RMS ($R_q$) | 141.23 nm |
| peak-to-valley ($R_t$) | 0.39 μm |
| minimum distance between scratches | 10.11 μm |
| scratch number | 50 |

Signal Processing Algorithms

The wavelet transform algorithm processing techniques of the invention have been compared to conventional simple threshold, dynamic threshold, and exclusion techniques, and are described below.

Simple Threshold

Figure 10:
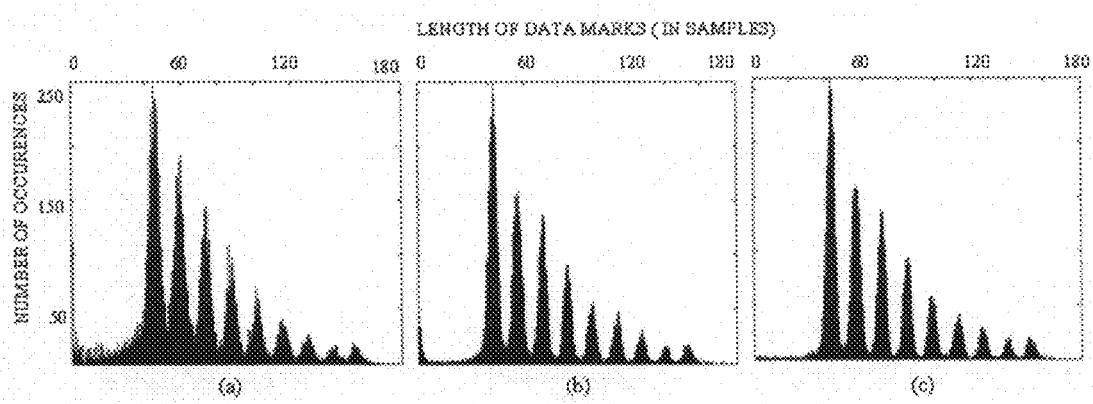
FIGS. 10A-10C are histograms for a signal from Sample 2 with a simple threshold (FIG. 10A), dynamic threshold (FIG. 10B), and wavelet algorithm (FIG. 10C)

In a simple threshold technique, the median of the digitized RF signal is used as a threshold, and the transition points at the threshold are used to decide the lengths of the data marks and lands. Due to the process by which data are written on the CD, data marks are about 40% longer than lands. Hence, separate bin segmentation is applied for data marks and lands. The histogram plot of data mark runlengths of the signal retrieved from Sample 2 processed with simple threshold is as shown in FIG. 10A. Groups were not well separated, because transitions were missed in the regions of the defects. The simple threshold method works well for a disc surface that is free from defects. It also works for fragmented discs with a defect-free surface.

Dynamic Threshold Technique

The dynamic threshold adjustment algorithm follows the offset of the RF signal in the presence of defects. The threshold follows the rise and fall of the envelope, and keeps the threshold line near the middle of the data signal, as shown in FIG. 9B. The histograms for Sample 2 obtained are shown in FIG. 10B. The run length distributions are better separated than by using simple threshold.

Exclusion Technique

The exclusion technique was developed for damage that results in removal of the data layer, like in the case of dye-side knurling. As mentioned above, the intensity of the reflected light is very low in the regions of defects and manifests itself as peaks in the digitized signal. A plot of 40,000 samples of a signal from dye-side knurled disc centered at a knurled depression is as shown as the region for State B FIG. 9A. On using a simple threshold with these data, such a peak is misjudged as a data mark that is longer than the usual bin segmented values. The region for State C is usually adjacent to the region for State B, where the envelope reduces below the threshold. Though signal transitions are visible in State C, it is misjudged as a long land. Such long runs easily go over 5,000 samples in length, which is much longer than the maximum run length (about 180 samples) for the 11T pattern expected from its Gaussian distribution. The exclusion technique excludes the long-run samples in the calculation of the threshold used for determining the transition points of the reflectivity of the disc. A new threshold after application of the exclusion technique is more to the mid-value of the data.

Wavelet-Transform-Based Signal Processing Algorithm

Discrete 2-channel wavelet decomposition was found to improve digitized W data signal characteristics. The number of levels of decomposition (j) of the signal is decided based on 2 criteria: The number of samples in the signal is a multiple of $2^j$ to carry out the implementation. Decomposition is performed up to a scale that gives good frequency resolution of the coefficients that cause offset in the signal.

Figure 11:
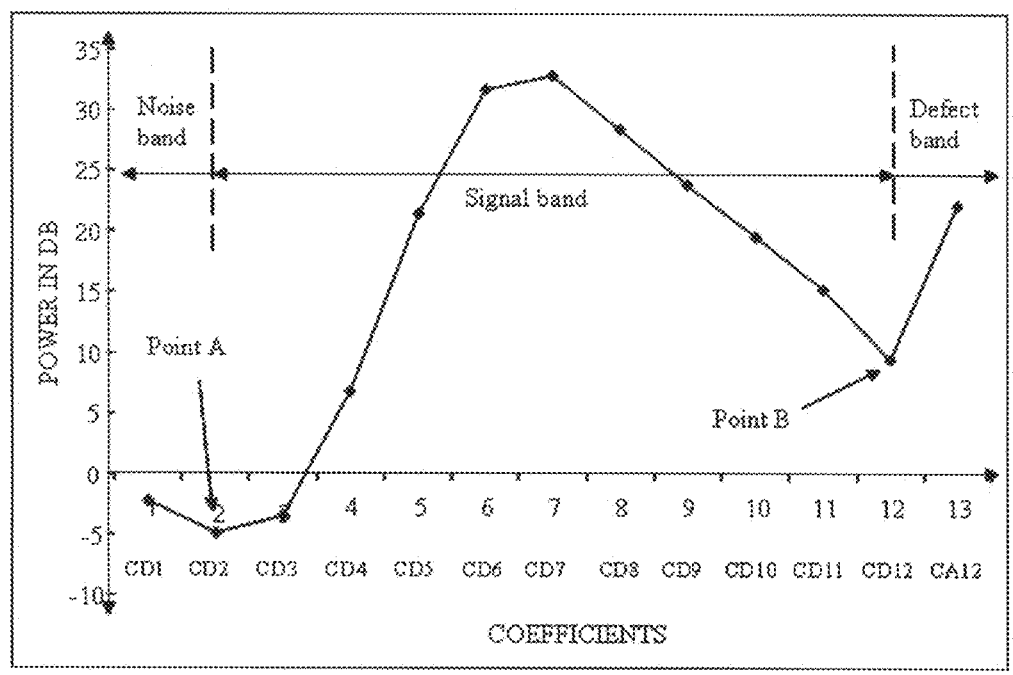
FIG. 11 is a schematic of the power content of the wavelet coefficients of 12-level decomposition of the RF signal retrieved from an undamaged CD.

Based on these two criteria, the level of decomposition for this comparison to the conventional data processing techniques was chosen to be j=12. The power spectrum of the wavelet coefficients at each level of decomposition was derived. The plot of the power spectrum of digitized RF signal from an undamaged portion of a CD is as shown in FIG. 11. The plot has two minima (Points A and B) marking the separation of the signal and noise/defect bands at both lower and higher scales, respectively. This trend in the power spectrum is expected, since the digitized signal is a narrowband signal. Hence, its power is concentrated in a mid-band of frequencies. Two WT algorithms processing techniques of the invention are detailed below are:

Envelope adjustment technique—where coefficients at higher scales or low frequencies (defect band) are altered.

Wavelet de-noising algorithm—where coefficients at lower scales or higher frequencies (noise band) are altered.

Figure 12A:
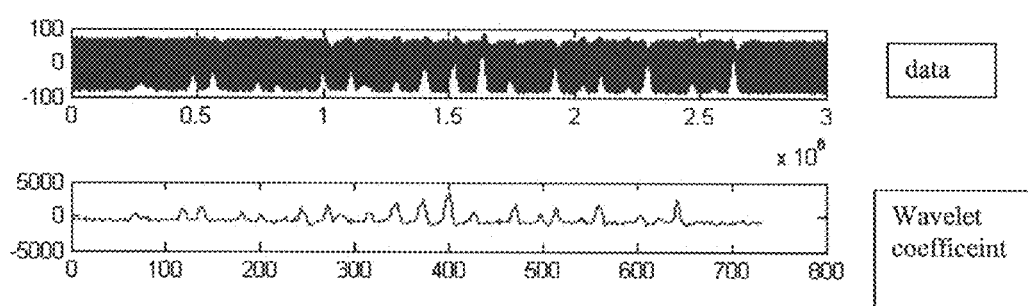
FIG. 12A is a schematic of an RF data signal from Sample 2 (substrate-side knurled disc)

Envelope Adjustment Technique in the Wavelet-Transform-Based Signal Processing Algorithm Comparison of the signal with an upsampled version of $CA_{12}$ (approximation coefficients at level j=12) is shown in FIG. 12A. It can be seen that the $CA_{12}$ gives the exact location of the defects in the envelope of the signal. Thus, the band of frequencies at the highest scale in 12-level decomposition of the signal has direct impact on the offsets in the envelope of the signal.

Figure 12B:
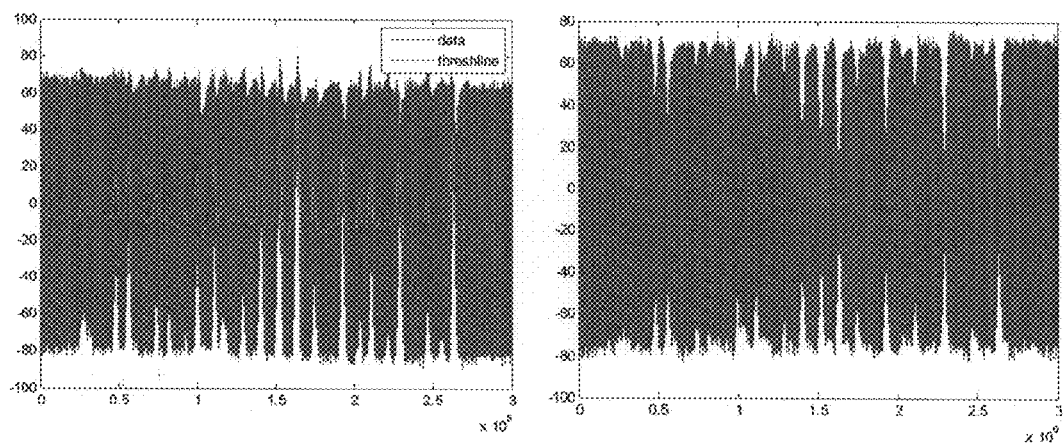
FIG. 12B is a schematic of the envelop offset becoming symmetric about the median of the signal in FIG. 12A.

The offsets are removed by replacing these coefficients with a predetermined value (e.g., a constant value), which in one embodiment is a median value of the coefficients. In other embodiments, a value offset from the mean value can be used. Reconstruction is then performed from the altered coefficients. This method does not completely remove the effect of the defects, since the defects have a wider bandwidth than $CA_{12}$. The effect of defects is seen in up to $CD_7$. However, only $CA_{12}$ can be altered without altering the information content of the signal. The effects of defects can be nearly completely removed by doing wavelet packet analysis at each of the levels up to level 7, where the defect effect is observed. This technique does make the signal swing symmetric around the simple threshold, as shown in FIG. 12B showing a comparison of initially read data and wavelet processed data. The left-hand side of FIG. 12B shows data affected by substrate-side knurling and shows thereon a dynamic threshold. The right-hand side of FIG. 12B shows a wavelet processed signal in which the threshold is symmetrical.

Wavelet De-Noising in the Wavelet-Transform-Based Signal Processing Algorithm

This method is based on a linear conventional de-noising algorithm. According to which, once the noise coefficients are identified, the signal can be reconstructed, which occurs in one embodiment after replacing the noise coefficients by zeros. In other embodiments, the noise coefficients can be replaced by non-zero values. From the observation of the power spectrum in FIG. 11, the minimum point at the lower scales marks the separation of the high frequency noise band and the signal band. The noise band is identified and the detail coefficients of the corresponding scales are replaced with zeros (or other suitably low values) to remove these frequencies.

Wavelet de-noising is useful in this application, because the process of conversion from a sinusoidal signal to a digital signal is based on the signal transitions above and below a threshold. If the digitized signal is affected by high frequency noise, the signal transitions are incorrectly placed, which results in erroneous decoding of runlengths. The Gaussian approximation helps in accounting for these errors and decodes them reliably, but there is still a degree of uncertainty and possible errors in decoding at the decision points. Using the wavelet de-noising algorithm, the shorter-than-usual wavelengths are completely removed, and the bins are better separated. The remarkable increase in the ability to decode at the defected areas is observed from this plot and also from the values in Table III.

By using wavelet-based-algorithms, the probability of error in decoding run lengths decreases. Once the lengths are reliably decoded, the run length streams are assigned corresponding EFM patterns and grouped into EFM frames. Since the EFM frame is the basic information unit of data written on a CD, the above mentioned signal processing algorithms are compared by finding the number of errant EFM frames that occur in the recovered EFM frames. Recovery statistics are analyzed by considering 5M samples of the sampled RF signal from Samples 1-3.

In Table IV, comparisons of the different signal processing algorithms are based on the number EFM frames affected by long runs and the number of other errant EFM frames. Errant frames containing long runs are very significant, since defects are very often misjudged as longer-than-usual run lengths and data at these areas are missed. As a result, several EFM frames have data missing. The number of such EFM frames affected by long runs for each case is entered under the column named LR in Table IV.

Figure 13A:
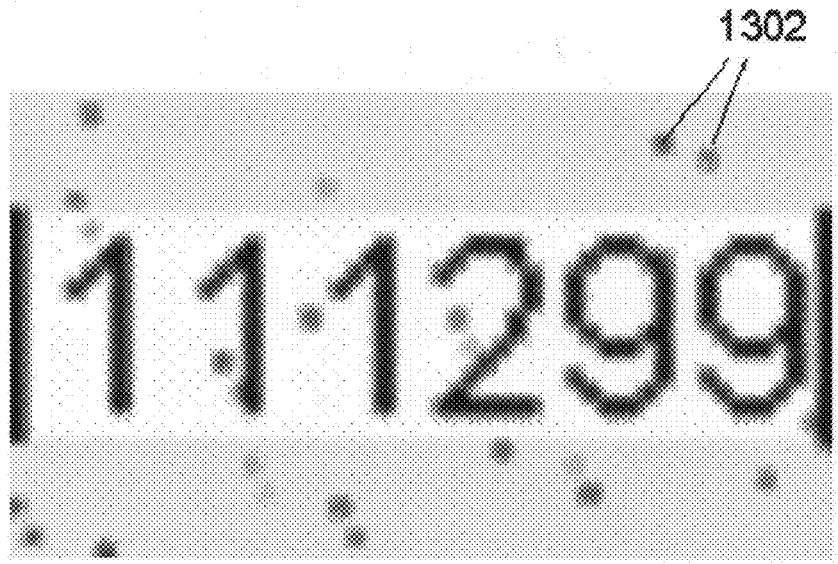
FIGS. 13A and 13B are bit map reconstructions.
Figure 13B:
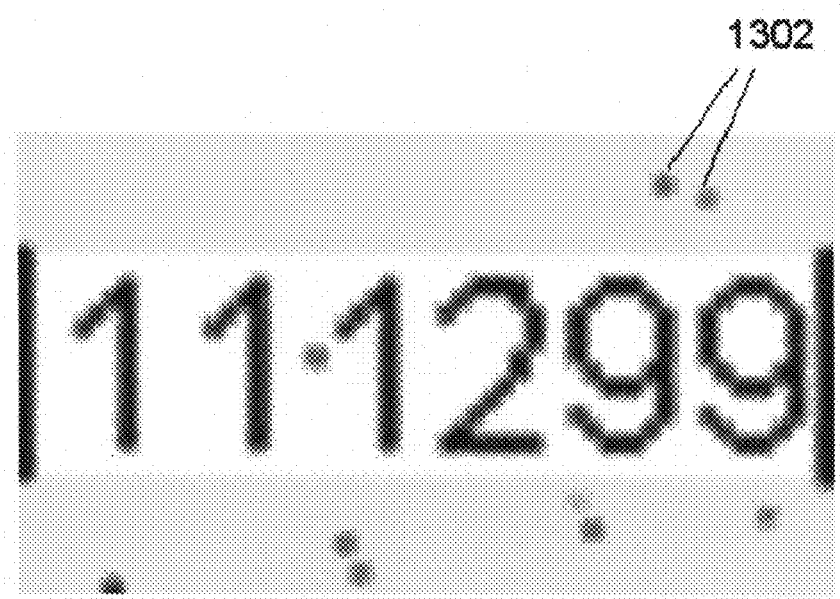

An illustration of the data recovery capability of the invention is shown in FIGS. 13A and 13B. FIG. 13A shows a bit map reconstruction with conventional data reconstruction. FIG. 13B shows a bit map reconstruction with wavelet reconstruction of the invention. As shown in FIGS. 13A and 13B, the number of defects in the data (1302) is reduced using wavelet reconstruction. These bit map reconstruction have been made from data recovered from a broken half disc. The original figure contains a six digit number in a white background with yellow border. The multicolor dots in the reconstructed figures show the effect of noise in the recovered signals. Note that the bit map from wavelet processed data contains less number of error dots compared to the other bit map.

Figure 14:
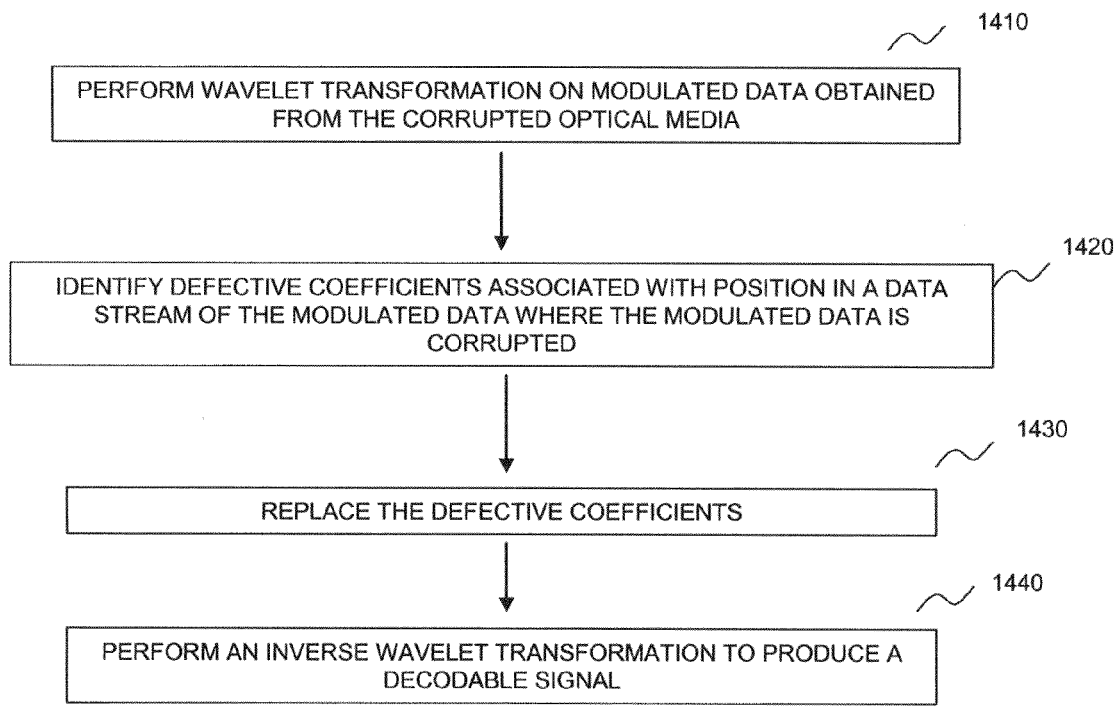
FIG. 14 is a flowchart of a method for recovering damaged data from an optical disk according to an embodiment of the invention.

FIG. 14 shows the general steps in the method described above for recovering data from a damaged CD. In step 1410 a wavelet transformation is performed on modulated data obtained from the corrupted optical media to identify frequencies of the modulated data at respective times. In step 1420, defective coefficients are identified that are associated with positions in a data stream of the modulated data where the modulated data is corrupted. In step 1430, the defective coefficients are replaced. In step 1440, an inverse wavelet transformation is performed to produce a decodable signal for the corrupted optical medium.

TABLE III

COMPARISON OF PROBABILITY OF ERROR, $P_E$ OF DECODING RUNLENGTHS
FOR THE THREE TYPES OF SIGNAL PROCESSING ALGORITHMS

| Sample used | Simple Threshold | | Dynamic Threshold/ Exclusion Technique | | Wavelet Processing | |
| --- | --- | --- | --- | --- | --- | --- |
| | Data marks | Lands | Data marks | Lands | Data marks | Lands |
| Sample 1 (Dye-side knurling) | 0.022875 | 0.0013 | 0.022875 | 0.0013 | 0.000675 | 0.000125 |
| Sample 2 (Substrate-side knurling) | 0.016133 | 0.003033 | 0.001433 | 0 | 0.001067 | 0 |
| Sample 3 (Scratched substrate) | 0.034725 | 0.082225 | 0.000337 | 0.004181 | 0.0000458 | 0.00113 |

Additionally, the modulated data can be transformed by a wavelet transform. Transforming the modulated data by a wavelet transform may include transforming with a symmetric and orthogonal impulse response function.

The modulated data may also be transformed by a tree filter having plural levels of low-pass and high-pass filters. The modulated data may also be transformed by a 2-channel wavelet decomposition.

TABLE IV

COMPARISON OF RECOVERY STATISTICS

| | Simple Threshold (No. of EFM frames) | | | Dynamic Threshold (No. of EFM frames) | | | Wavelet-based-algorithms (No. of EFM frames) | | |
|---|---|---|---|---|---|---|---|---|---|
| | LR | Errant | Total | LR | Errant | Total | LR | Errant | Total |
| Sample 1 (Dye-side knurling) | 89.25 | 66 | 574.25 | 89.25 | 66 | 574.25 | 5.5 | 29.75 | 584.5 |
| Sample 2 (Substrate-side knurling) | 42 | 102.33 | 584.67 | 13.67 | 62.67 | 587 | 4 | 45 | 583.67 |
| Sample 3 (Scratched substrate) | 100 | 193 | 505 | 29 | 109 | 507.33 | 25 | 59 | 508 |

Transforming the modulated data may also include producing frequency coefficients indicative of respective amplitudes of the modulated data at respective points in the modulated data. In this method, the defect coefficients are identified from the frequency coefficients and replacing the identified defect coefficients with a predetermined value. For example, the identified defect coefficients can be replaced by less than some critical value. One approach would be to replace identified defect coefficients with a value such that a power spectrum of approximation and detail coefficients (such as shown in FIG. 11) would not show an inflection at point B. Also, the defect coefficients can be replaced with a median value of the approximation coefficients. Also, an inverse transformation can be calculated with replaced coefficients to produce the decoded signal. The decoded signal may also be thresholded to identify lands and marks in the decoded signal associated with the modulated data.

The frequency coefficients may also be used to identify noise coefficients and replacing the noise coefficients with a predetermined value (e.g., a constant value). As an example, the noise coefficients can be replaced with a zero value or an otherwise small value. Here, the replaced noise coefficients can be used calculate an inverse wavelet transformation to produce the decoded signal. The decoded signal may then be thresholded to identify lands and marks in the decoded signal associated with the modulated data.

Figure 15:
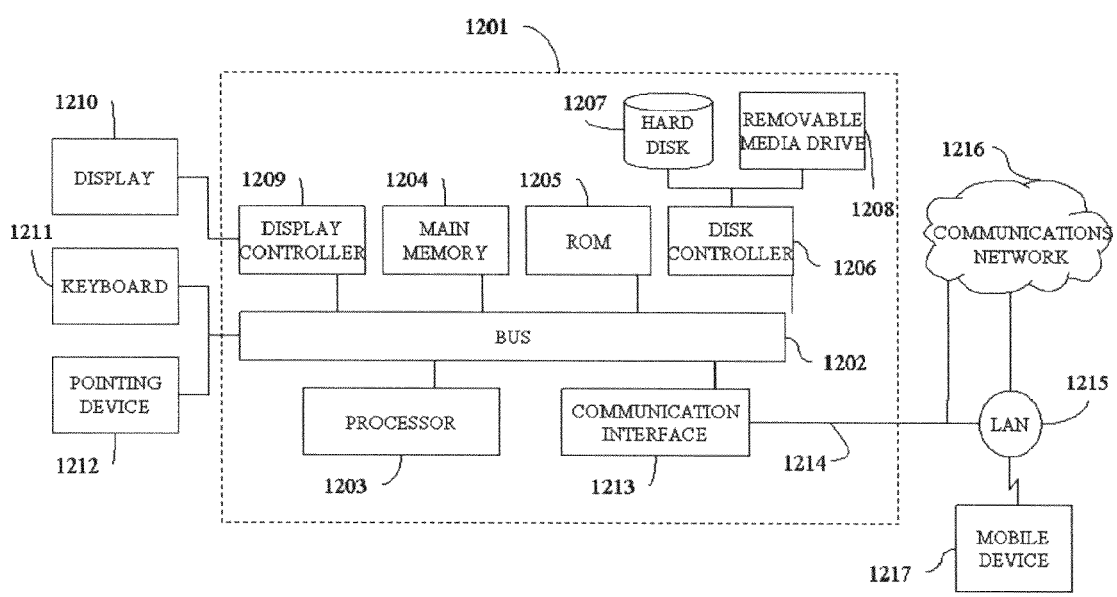
FIG. 15 is a schematic of general purpose processor of the invention.

FIG. 15 illustrates one embodiment of a computer system 1201 in which the data processing and recovery techniques and/or control of the optical read system can be implemented. The computer system 1201 can be a part of the ACC of FIG. 2, and is programmed and/or configured to perform any or all of the functions described above, including but not limited to the functions described with regard to FIG. 14. The computer system 1201 includes a bus 1202 or other communication mechanism for communicating information, and a internal processor 1203 coupled with the bus 1202 for processing the information. The computer system 1201 includes a memory 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by the internal processor 1203. In addition, the memory 1204 can be used for storing temporary variables or other intermediate information during the execution of instructions by the internal processor 1203. The computer system 1201 preferably includes a non-volatile memory such as for example a read only memory (ROM) 1205 or other static storage device (e.g., programmable ROM (PROM), erasable PROM (EPROM), and electrically erasable PROM (EEPROM)) coupled to the bus 1202 for storing static information and instructions for the internal processor 1203.

The computer system 1201 may include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 performs a portion or all of the processing steps of the invention in response to the internal processor 1203 executing one or more sequences of one or more instructions contained in a memory, such as the main memory 1204. Such instructions may be read into the main memory 1204 from another computer readable medium, such as a hard disk 1207 or a removable media drive 1208. Such capability being compatible mostly with the embodiment in which the electronic monitoring device is outside the semiconductor processing system 12. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the teachings of the invention and for containing data structures, tables, records, or other data described herein. Examples of computer readable media suitable for the present invention are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or any other physical medium with patterns of holes, a carrier wave (described below), or any other medium from which a computer can read.

Stored on any one or on a combination of computer readable media, the present invention includes software for controlling the computer system 1201, for driving a device or devices for implementing the invention, and for enabling the computer system 1201 to interact with a human user (e.g., to interact with consumable part disposal personnel). Such software may include, but is not limited to, device drivers, operating systems, development tools, and applications software. Such computer readable media further includes the computer program product of the invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the internal processor 1203 for execution. A computer readable medium may take many forms, including but not limited to, non-volatile media, volatile media, and transmission media. Non-volatile media includes, for example, optical, magnetic disks, and magneto-optical disks, such as the hard disk 1207 or the removable media drive 1208. Volatile media includes dynamic memory, such as the main memory 1204. Transmission media includes coaxial cables, copper wire and fiber optics, including the wires that make up the bus 1202. Transmission media also may also take the form of acoustic or light waves, such as those generated during radio wave and infrared data communications.

Various forms of computer readable media may be involved in carrying out one or more sequences of one or more instructions to internal processor 1203 for execution. For example, the instructions may initially be carried on a magnetic disk of a remote computer. The remote computer such as for example the tool controller 26 can load the instructions for implementing all or a portion of the present invention remotely into a dynamic memory and send the instructions to the electronic monitoring device 10. An infrared detector coupled to the bus 1202 can receive the data carried in the infrared signal and place the data on the bus 1202. The bus 1202 carries the data to the main memory 1204, from which the internal processor 1203 retrieves and executes the instructions. The instructions received by the main memory 1204 may optionally be stored on storage device 1207 or 1208 either before or after execution by the internal processor 1203.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information. This information communicated with processor 1203 includes the modulated data discussed above with regard to data recovery from a corrupted optical medium, such as for example a corrupted optical disk.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc). The signals through the various networks and the signals on the network link 1214 and through the communication interface 1213, which carry the digital data to and from the computer system 1201 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214, and the communication interface 1213.

Numerous modifications and variations of the present invention are possible in light of the above teachings. It is, therefore, to be understood that within the scope of the accompanying claims, the invention may be practiced otherwise than as specifically described herein.

The invention claimed is:

1. An optical data recovery system comprising:
an optical receiver configured to receive light reflected from an optical medium and produce modulated data;
a processing unit configured to transform the modulated data at least by a wavelet transform into a series of transform coefficients respectively identifying frequencies of the modulated data at respective times; and
said processing unit configured to identify from the series of transform coefficients defect coefficients associated with positions in the modulated data where the modulated data is corrupted.

2. The system of claim 1, wherein the wavelet transform comprises a substantially symmetric and orthogonal impulse response function.

3. The system of claim 1, wherein the processing unit is configured to wavelet transform the modulated data by a 2-channel wavelet decomposition.

4. The system of claim 3, wherein the wavelet decomposition produces frequency coefficients indicative of respective amplitudes of the modulated data at respective points in the modulated data.

5. The system of claim 4, wherein the processing unit is configured to identify said defect coefficients from the frequency coefficients and replace the identified defect coefficients with a predetermined value.

6. The system of claim 5, wherein the processing unit is configured to replace said defect coefficients with a median value of the frequency coefficients.

7. The system of claim 5, wherein the processing unit is configured to calculate an inverse transformation with replaced coefficients to produce a decoded signal.

8. The system of claim 7, wherein the inverse transformation comprises an inverse wavelet transformation.

9. The system of claim 8, wherein the inverse wavelet transform comprises a substantially symmetric and orthogonal impulse response function.

10. The system of claim 7, wherein the processing unit is configured to threshold the decoded signal to identify lands and marks in the decoded signal associated with the modulated data.

11. The system of claim 4, wherein the processing unit is configured to identify noise coefficients from the frequency coefficients and replace the noise coefficients with a predetermined value.

12. The system of claim 11, wherein the processing unit is configured to replace said noise coefficients with a zero value.

13. The system of claim 11, wherein the processing unit is configured to calculate an inverse wavelet transformation with replaced noise coefficients to produce a decoded signal.

14. The system of claim 13, wherein the inverse wavelet transform comprises a substantially symmetric and orthogonal impulse response function.

15. The system of claim 13, wherein the processing unit is configured to threshold the decoded signal to identify lands and marks in the decoded signal associated with the modulated data.

16. An optical data recovery system comprising:
   an optical receiver configured to receive light reflected from an optical medium and produce modulated data;
   a processing unit configured to transform the modulated data into a series of transform coefficients respectively identifying frequencies of the modulated data at respective times;
   said processing unit configured to identify from the series of transform coefficients defect coefficients associated with positions in the modulated data where the modulated data is corrupted,
   wherein the processing unit is configured to transform the modulated data by a tree filter having plural levels of low-pass and high-pass filters.

17. The system of claim 16, wherein the tree filter is configured to decompose the modulated data with a frequency resolution for identification of said defect coefficients.

18. An optical data recovery system comprising:
   an optical receiver configured to receive light reflected from an optical medium and produce modulated data;
   a processing unit configured to transform the modulated data into a series of transform coefficients respectively identifying frequencies of the modulated data at respective times;
   said processing unit configured to identify from the series of transform coefficients defect coefficients associated with positions in the modulated data where the modulated data is corrupted;
   a drive mechanism configured to translate the optical medium;
   a beam source configured to irradiate the optical medium;
   a servo controller configured to change a relative distance between the optical receiver and the optical medium;
   said servo controller including a defect identification circuit which identifies whether the light is reflected from a defect; and
   said servo controller is configured to control the relative distance between the optical receiver and the optical medium, until the light reflected from the optical medium returns to a normal level.

19. The system of claim 18, wherein the defect identification circuit is configured to identify the defect on a basis of an intensity change in the light reflected from the optical medium.

20. The system of claim 18, wherein the servo controller comprises a feedback loop control which, when the light is reflected from a defect spot, provides an average position value for said relative distance.

21. The system of claim 20, wherein the feedback loop comprises a pre-control unit configured to determine said average position value.

22. The system of claim 20, wherein the servo controller includes an optical detector configured to determine said average position value.

23. An optical data recovery system comprising:
   an optical receiver configured to receive light reflected from an optical medium and produce modulated data;
   a processing unit configured to transform the modulated data into a series of transform coefficients respectively identifying frequencies of the modulated data at respective times;
   said processing unit configured to identify from the series of transform coefficients defect coefficients associated with positions in the modulated data where the modulated data is corrupted;
   a drive mechanism configured to translate the optical medium;
   a beam source configured to irradiate the optical medium;
   a servo controller configured to change a relative distance between the optical receiver and the optical medium;
   said servo controller including a defect identification circuit which identifies whether the light is reflected from a defect; and
   said servo controller is configured to control the relative distance between the optical receiver and the optical medium, until the light reflected from the optical medium returns to a normal level,
   wherein the servo controller stabilizes the relative distance between the optical receiver and the optical medium, until the light reflected from the optical medium returns to a normal level.

24. A method for data recovery from a corrupted optical medium, comprising:
   performing at least by a wavelet transform a transformation on modulated data obtained from the corrupted optical medium to identify frequencies of the modulated data at respective times;
   identifying defect coefficients associated with positions in a data stream of the modulated data where the modulated data is corrupted;
   replacing the defect coefficients; and
   performing an inverse transformation to produce a decoded signal for the corrupted optical medium.

25. The method of claim 24, wherein the performing at least by a wavelet transform comprises transforming with a substantially symmetric and orthogonal impulse response function.

26. The method of claim 24, further comprising:
   transforming the modulated data by a 2-channel wavelet decomposition.

27. A method for data recovery from a corrupted optical medium, comprising:
    performing a transformation on modulated data obtained from the corrupted optical medium to identify frequencies of the modulated data at respective times;
    identifying defect coefficients associated with positions in a data stream of the modulated data where the modulated data is corrupted;
    replacing the defect coefficients;
    performing an inverse transformation to produce a decoded signal for the corrupted optical medium; and
    transforming the modulated data by a tree filter having plural levels of low-pass and high-pass filters.

28. A method for data recovery from a corrupted optical medium, comprising:
    performing a transformation on modulated data obtained from the corrupted optical medium to identify frequencies of the modulated data at respective times;
    identifying defect coefficients associated with positions in a data stream of the modulated data where the modulated data is corrupted;
    replacing the defect coefficients;
    performing an inverse transformation to produce a decoded signal for the corrupted optical medium; and
    producing frequency coefficients indicative of respective amplitudes of the modulated data at respective points in the modulated data.

29. The method of claim 28, further comprising:
    identifying said defect coefficients from the frequency coefficients and replacing the identified defect coefficients with a predetermined value.

30. The method of claim 29, further comprising:
    replacing said defect coefficients with a median value of the frequency coefficients.

31. The method of claim 29, further comprising:
    calculating an inverse transformation with replaced coefficients to produce the decoded signal.

32. The method of claim 31, further comprising:
    thresholding the decoded signal to identify lands and marks in the decoded signal associated with the modulated data.

33. The method of claim 28, further comprising:
    identifying noise coefficients from the frequency coefficients and replacing the noise coefficients with a predetermined value.

34. The method of claim 33, further comprising:
    replacing said noise coefficients with a zero value.

35. The method of claim 33, further comprising:
    calculating an inverse wavelet transformation with replaced noise coefficients to produce the decoded signal.

36. The method of claim 35, further comprising:
    thresholding the decoded signal to identify lands and marks in the decoded signal associated with the modulated data.

37. A non-transitory computer program product stored on a computer readable medium which, when read by a processor, executes the following program executable functions, comprising:
    performing at least by a wavelet transform a transformation on modulated data obtained from a corrupted optical medium to identify frequencies of the modulated data at respective times;
    identifying defect coefficients associated with positions in a data stream of the modulated data where the modulated data is corrupted;
    replacing the defect coefficients; and
    performing an inverse transformation to produce a decoded signal for the corrupted optical medium.

38. The non-transitory computer program product of claim 37, wherein the performing at least by a wavelet transform comprises transforming with a substantially symmetric and orthogonal impulse response function.

39. The non-transitory computer program product of claim 37, wherein the executable functions further comprise:
    transforming the modulated data by a 2-channel wavelet decomposition.

40. A non-transitory computer program product stored on a computer readable medium which, when read by a processor, executes the following program executable functions, comprising:
    performing a transformation on modulated data obtained from a corrupted optical medium to identify frequencies of the modulated data at respective times;
    identifying defect coefficients associated with positions in a data stream of the modulated data where the modulated data is corrupted;
    replacing the defect coefficients;
    performing an inverse transformation to produce a decoded signal for the corrupted optical medium; and
    transforming the modulated data by a tree filter having plural levels of low-pass and high-pass filters.

41. A non-transitory computer program product stored on a computer readable medium which, when read by a processor, executes the following program executable functions, comprising:
    performing a transformation on modulated data obtained from a corrupted optical medium to identify frequencies of the modulated data at respective times;
    identifying defect coefficients associated with positions in a data stream of the modulated data where the modulated data is corrupted;
    replacing the defect coefficients;
    performing an inverse transformation to produce a decoded signal for the corrupted optical medium; and
    producing frequency coefficients indicative of respective amplitudes of the modulated data at respective points in the modulated data.

42. The non-transitory computer program product of claim 41, wherein the executable functions further comprise:
    identifying said defect coefficients from the frequency coefficients and replacing the identified defect coefficients with a predetermined value.

43. The non-transitory computer program product of claim 42, wherein the executable functions further comprise:
    replacing said defect coefficients with a median value of the frequency coefficients.

44. The non-transitory computer program product of claim 42, wherein the executable functions further comprise:
    calculating an inverse transformation with replaced coefficients to produce the decoded signal.

45. The non-transitory computer program product of claim 44, wherein the executable functions further comprise:
    thresholding the decoded signal to identify lands and marks in the decoded signal associated with the modulated data.

46. The non-transitory computer program product of claim 41, wherein the executable functions further comprise:
    identifying noise coefficients from the frequency coefficients and replacing the noise coefficients with a predetermined value.

47. The non-transitory computer program product of claim 46, wherein the executable functions further comprise:
    replacing said noise coefficients with a zero value.

48. The non-transitory computer program product of claim 46, wherein the executable functions further comprise:
calculating an inverse wavelet transformation with replaced noise coefficients to produce the decoded signal.

49. The non-transitory computer program product of claim 48 wherein the executable functions further comprise:
thresholding the decoded signal to identify lands and marks in the decoded signal associated with the modulated data.

50. An optical data recovery system comprising:
an optical receiver configured to receive light reflected from an optical medium and produce modulated data;
a processing unit configured to transform the modulated data into a series of transform coefficients respectively identifying frequencies of the modulated data at respective times;
said processing unit configured to identify from the series of transform coefficients defect coefficients associated with positions in the modulated data where the modulated data is corrupted; and
a defect identification circuit configured to identify a defect on a basis of an intensity change in the light reflected from the optical medium.

* * * * *